(12) United States Patent
Katsuki et al.

(10) Patent No.: US 7,502,015 B2
(45) Date of Patent: Mar. 10, 2009

(54) TOUCH PANEL DEVICE

(75) Inventors: Takashi Katsuki, Kawasaki (JP); Satoshi Sano, Kawasaki (JP); Yuji Takahashi, Kawasaki (JP); Fumihiko Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 618 days.

(21) Appl. No.: 11/017,838

(22) Filed: Dec. 22, 2004

(65) Prior Publication Data

US 2006/0038798 A1 Feb. 23, 2006

(30) Foreign Application Priority Data

Aug. 20, 2004 (JP) ............... 2004-241064

(51) Int. Cl.
*G09G 5/00* (2006.01)
(52) U.S. Cl. ............... 345/173; 345/177; 178/18.04; 310/313
(58) Field of Classification Search ........... 345/173, 345/177; 178/18.04; 310/313
See application file for complete search history.

(56) References Cited

U.S. PATENT DOCUMENTS

| | | | | |
|---|---|---|---|---|
| 5,024,091 A | * | 6/1991 | Pellerin et al. ............... | 73/597 |
| 2002/0101408 A1 | | 8/2002 | Sano et al. | |
| 2003/0146673 A1 | * | 8/2003 | Toda et al. ............... | 310/313 D |
| 2004/0027342 A1 | | 2/2004 | Katsuki et al. | |
| 2004/0104827 A1 | | 6/2004 | Katsuki et al. | |

FOREIGN PATENT DOCUMENTS

| | | |
|---|---|---|
| JP | 2003-345504 | 12/2003 |
| JP | 2004-171213 | 6/2004 |
| KR | 2002-0063097 | 8/2002 |

\* cited by examiner

*Primary Examiner*—Richard Hjerpe
*Assistant Examiner*—Leonid Shapiro
(74) *Attorney, Agent, or Firm*—Westerman, Hattori, Daniels & Adrian, LLP.

(57) ABSTRACT

A transducer for excitation including two electrode, and at least one of the two electrodes is a comb-like electrode including a plurality of comb-like electrode fingers and a linear bus electrode to which one end of each of the plural comb-like electrode finger is connected. When dividing the transducer into two areas in the length direction of the bus electrode, at least one connection portion for one of the two electrodes is disposed in one of the two areas, while at least one connection portion for the other electrode is disposed in the other area.

8 Claims, 10 Drawing Sheets

TOUCH PANEL DEVICE

BACKGROUND OF THE INVENTION

1. Field of the Invention

The present invention relates to a touch panel device that determines a touch position of an object by detecting attenuation position of a surface acoustic wave due to a touch of the object. The touch panel device is used as an input device of a personal computer or a personal digital assistant, for example.

2. Description of the Prior Art

As an input device of a personal computer, a mobile computer, a personal digital assistant device (PDA) or the like, the touch panel device is often used in which information can be entered with the touch of a finger or a pen on a display screen of a display device.

There are two types of the touch panel devices. One utilizes a resistance film, and another utilizes a surface acoustic wave (SAW). The resistance film type has a multilayered resistance film in a touch area, which scatters light so that transmittance is low. A touch panel device of the surface acoustic wave type has transducers that are arranged at four sides of the touch area for emitting or receiving the surface acoustic wave. When a finger or the like touches the touch area, the touch position is detected in accordance with the attenuation position of surface acoustic wave. The surface acoustic wave type has an advantage of a high transmittance, a good visibility of the display screen and a high durability against a scratch because the touch area has no resistance film or the like.

The applicant proposed a structure of the surface acoustic wave type touch panel device in Japanese unexamined patent publication 2004-171213. This structure has a single phase transducer (SPT) of an electrode structure in which a piezoelectric thin film is sandwiched between a comb-like electrode and a plate electrode so that only one electrode is disposed on one surface. The structure also has a chevron type electrode structure in which dog-legged comb-like electrodes are arranged in a row.

The touch panel device includes a rectangular transparent substrate and total four transducers. Emitting transducers are disposed at the upper end portion and the lower end portion of the substrate while receiving transducers are disposed at the left end portion and the right end portion. The portion surrounded by the four transducers is the touch area. Each of the transducers has the SPT electrode structure described above and the chevron type electrode structure.

Each of the transducers has one end in the length direction where a wiring electrode and a connection portion between the comb-like electrode and the plate electrode are disposed closely to each other. An excitation voltage supplied via the wiring electrode is applied to the connection portion so that signal power supply is performed. In addition, a received signal is obtained from the connection portion to the wiring electrode so that signal fetch is performed. The other end of each of the wiring electrodes is drawn as a wire connection portion to one position of the substrate and is connected to a signal process circuit via a flexible cable or the like that is attached to the wire connection portion.

The excitation voltage is applied to the transducers disposed at the upper end and the lower end portions so as to generate surface acoustic waves. The generated surface acoustic wave propagates on the substrate in a diagonal direction and is received by the transducer disposed at the right or the left end portion. When a finger, a pen or the like touches a point in the touch area, the surface acoustic wave is attenuated at the touched point. Therefore, the touched position can be detected by a signal process in accordance with the position where a level of the received signal is attenuated.

It is desirable that excitation intensity of the surface acoustic wave be uniform within the touch area for the touch panel device that utilizes surface acoustic waves. However, when the excitation voltage is applied to the transducer from the connection portion, reflection of the signal occurs at the end portion opposite to the connection portion. Namely, a signal wave that is the excitation voltage is reflected at the end of the electrode and the reflected wave is superimposed with the signal wave. As a result, an intensity distribution is generated in the length direction of the transducer depending on delays of the signal wave and the reflected wave. For this reason, a substantial variation of the excitation intensity of the surface acoustic wave is generated in the touch area.

In order to solve this problem, a terminating resister may be disposed at the end ideally as described in the above Japanese unexamined patent publication 2004-171213. However, it is preferable to avoid adding the terminating resister from the viewpoint of simple process and low cost for manufacturing the transducer.

SUMMARY OF THE INVENTION

An object of the present invention is to suppress an influence of the reflected wave at the end and to reduce variation of excitation intensity of the surface acoustic wave without using a terminating resister.

A touch panel device according to one aspect of the present invention includes a touch area arranged at the middle portion of a transparent substrate, and a plurality of transducers arranged at a peripheral portion of the touch area, the transducer including a film-like piezoelectric element and two electrodes for excitation or reception of a surface acoustic wave. At least one of the two electrodes of the transducer for excitation is a comb-like electrode including a plurality of comb-like electrode fingers and a linear bus electrode to which one end of each of the plural comb-like electrode fingers is connected. When dividing the transducer into two areas equally in the length direction of the bus electrode, at least one connection portion for one of the two electrodes is disposed in one of the two areas, while at least one connection portion for the other electrode is disposed in the other area.

Preferably, two connection portions are provided for each of the two electrodes, and the connection portions are disposed in one area and the other area for each of the two electrodes.

In addition, the transducer includes the comb-like electrode that is formed on one surface of the piezoelectric element and a plate electrode that is formed on the other surface of the piezoelectric element so as to be opposed to the comb-like electrode, a wiring electrode is provided at the outer side of each of the comb-like electrode and the plate electrode in parallel with the comb-like electrode or the plate electrode, and each of the wiring electrodes is connected to the bus electrode or the plate electrode at the two connection portions.

In addition, the transducer includes the comb-like electrode that is formed on one surface of the piezoelectric element and a plate electrode that is formed on the other surface of the piezoelectric element so as to be opposed to the comb-like electrode, and a resistance of the bus electrode per unit length is equal to a resistance of the plate electrode per unit length.

In addition, the connection portion disposed in one area and the connection portion disposed in the other area are arranged at positions that divide a length of the transducer into three substantially equally.

According to the present invention, an influence of the reflected wave at the end can be suppressed without using a termination resistor so that a variation of the excitation intensity of the surface acoustic wave can be reduced.

DESCRIPTION OF THE PREFERRED EMBODIMENTS

Hereinafter, the present invention will be explained more in detail with reference to embodiments and drawings.

First Embodiment

Figure 1:
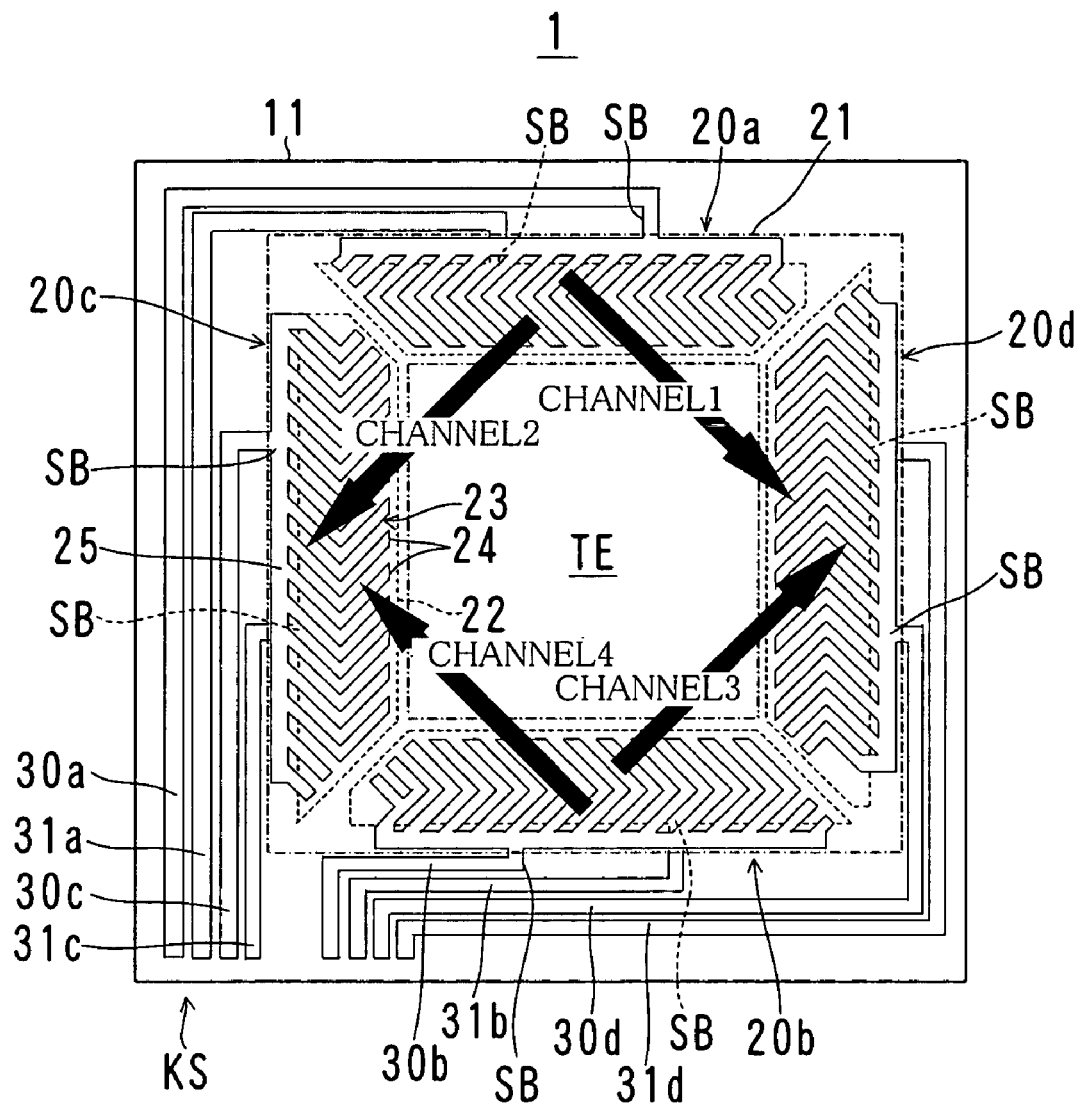
FIG. 1 is a plan view of a touch panel device according to a first embodiment of the present invention.
Figure 2:
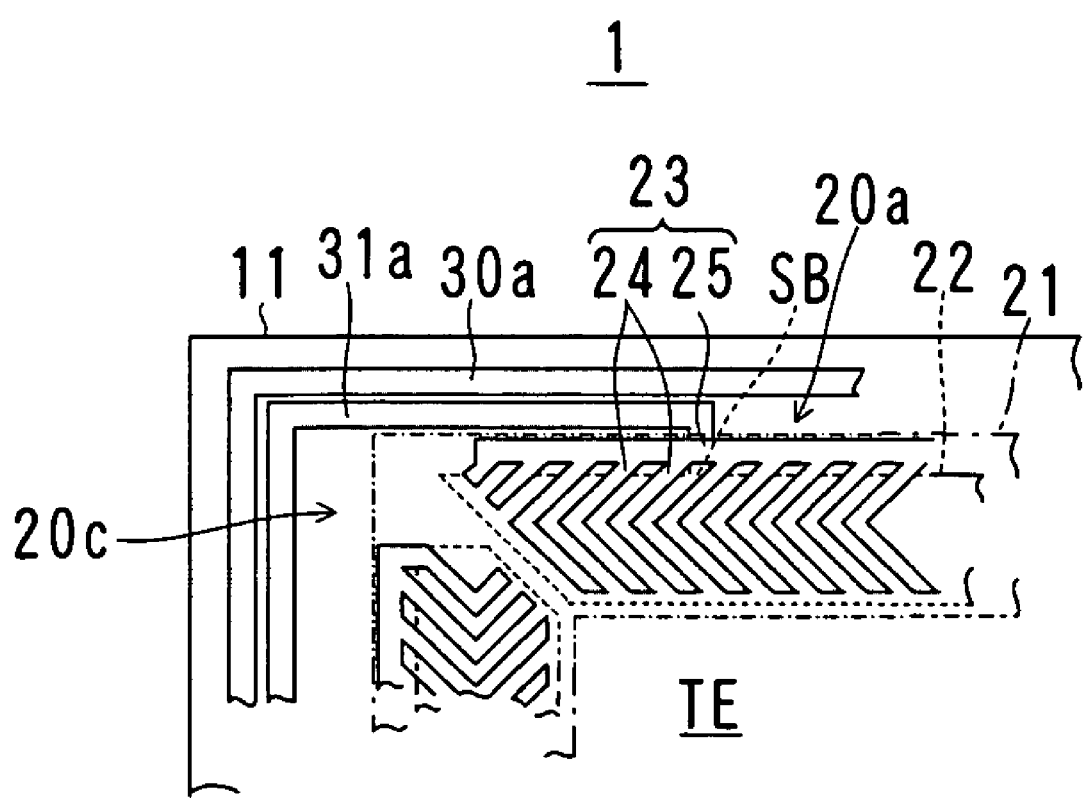
FIG. 2 is an enlarged view of a part of the touch panel device.
Figure 3:
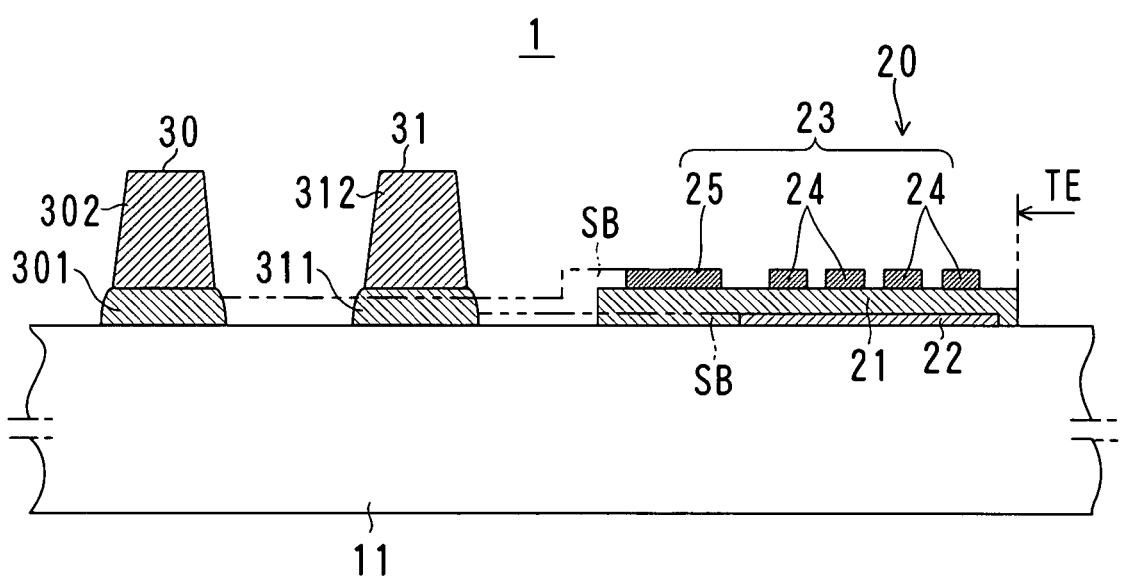
FIG. 3 is a cross section of a portion of the transducer shown in an enlarged manner.
Figure 4:
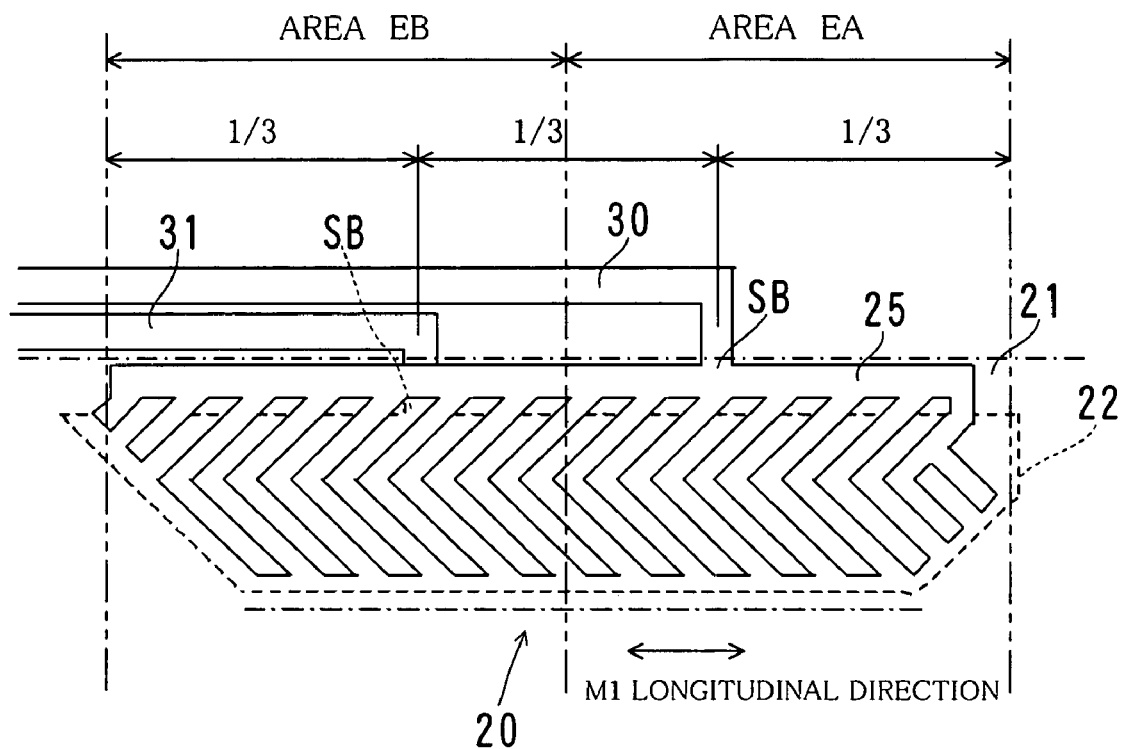
FIG. 4 shows a position of a connection portion.
Figure 5:
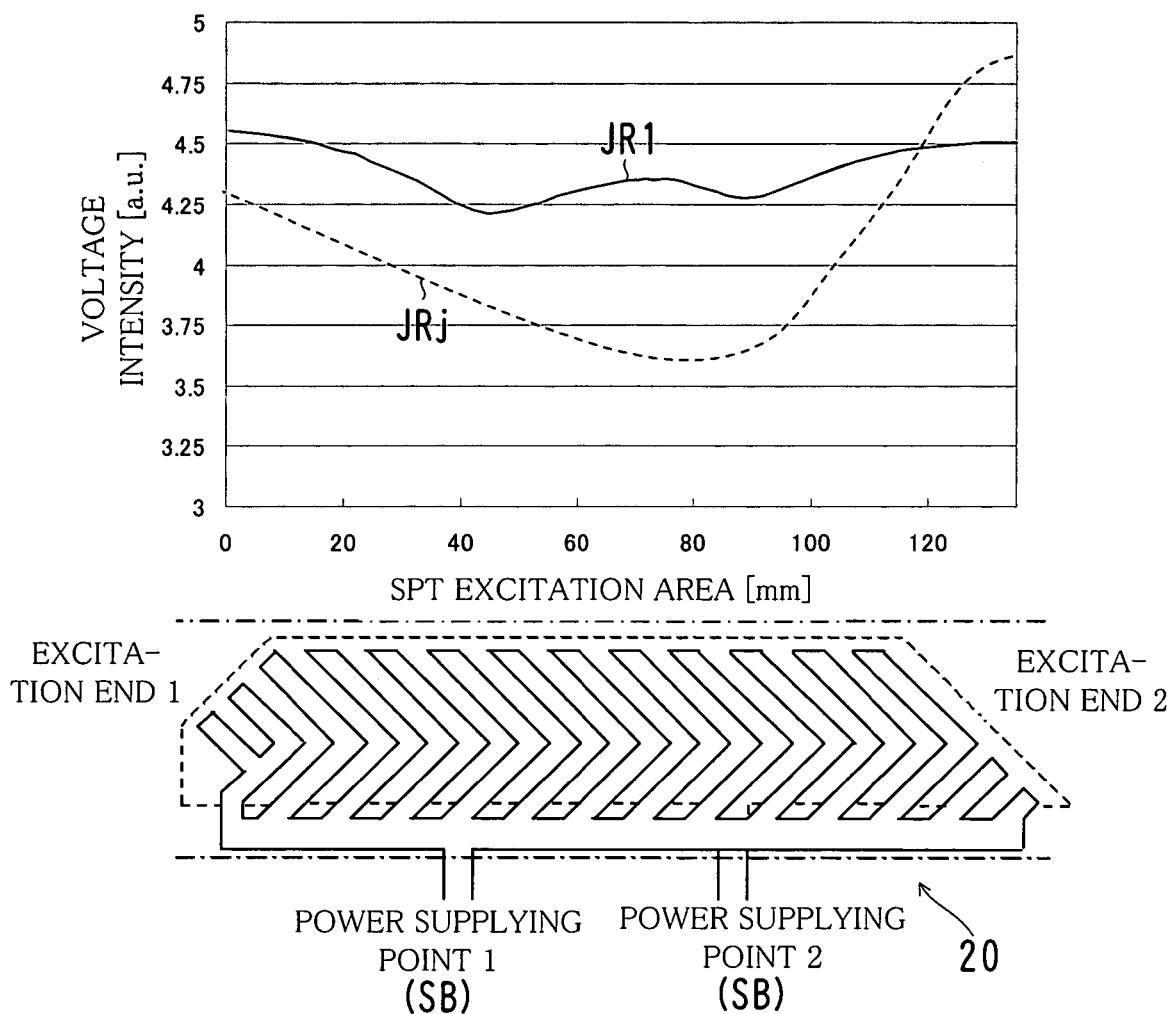
FIG. 5 shows an example of a voltage distribution of the transducer.
Figure 6:
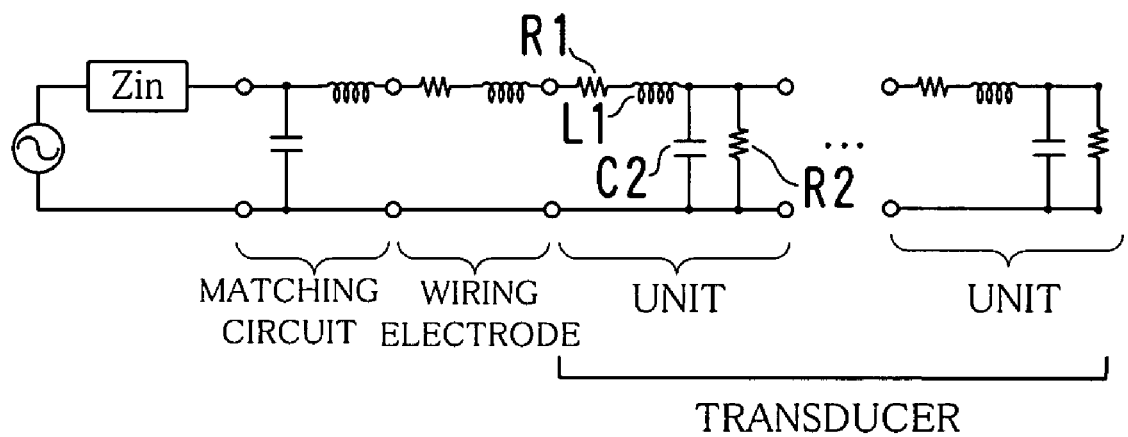
FIG. 6 shows an equivalent circuit of the transducer.
Figure 7:
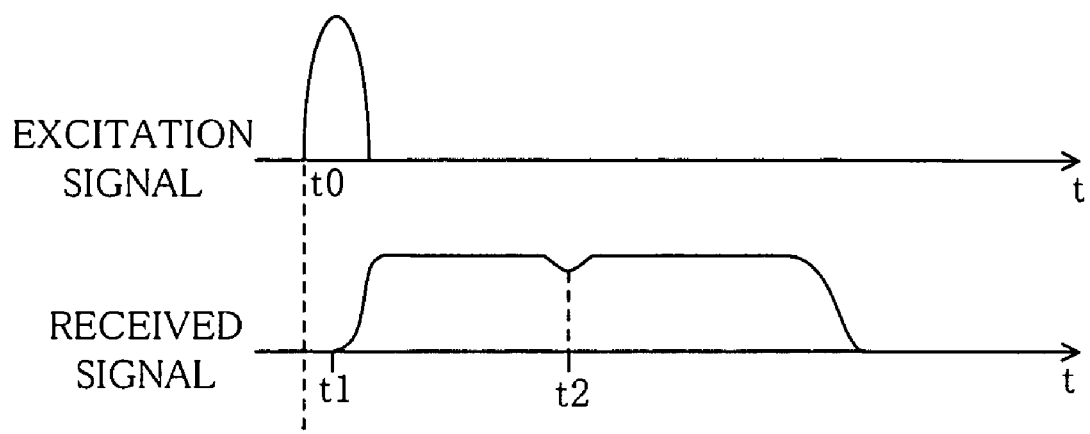
FIG. 7 shows waveforms of an excitation signal and a received signal.

FIG. 1 is a plan view of a touch panel device 1 according to a first embodiment of the present invention, FIG. 2 is an enlarged view of a part of the touch panel device 1, FIG. 3 is a cross section of a portion of the transducer 20 of the touch panel device 1 shown in an enlarged manner, FIG. 4 shows a position of a connection portion SB, FIG. 5 shows an example of a voltage distribution of the transducer 20, FIG. 6 shows an equivalent circuit of the transducer 20, and FIG. 7 shows an example of timings of an excitation signal and a received signal.

As shown in FIG. 1, the touch panel device 1 includes a rectangular transparent glass substrate 11, four transducers 20a-20d disposed at the edge portion of the substrate 11, and wiring electrodes 30a-30d and 31a-31d disposed at the periphery of the transducers 20a-20d. At the middle portion of the touch panel device 1, there is a touch area TE that is a rectangular portion surrounded by the transducers 20a-20d.

Two transducers 20a and 20b disposed at the upper and the lower side portions are used for excitation, while two transducers 20c and 20d disposed at the right and the left side portions are used for reception. An excitation voltage (or an excitation signal as shown in FIG. 7) is applied to the transducers 20a and 20b for excitation so as to generate surface acoustic waves, which propagate in the diagonal direction on the glass substrate 11 and are received by the transducers 20c and 20d for reception.

More specifically, the surface acoustic wave generated by the transducer 20a at the upper side portion propagates diagonally in the lower right direction (channel 1) and in the lower left direction (channel 2), which are received by the transducers 20c and 20d disposed at the right and the left side portions, respectively. The surface acoustic wave generated by the transducer 20b at the lower side portion propagates diagonally in the upper right direction (channel 3) and the upper left direction (channel 4), which are received by the transducers 20c and 20d disposed at the right and the left side portions, respectively. Note that the excitation voltage is applied to the transducers 20a and 20b for excitation alternately at different timings.

The time necessary for propagation of a surface acoustic wave is proportional to the propagation distance, so the arrival time of the surface acoustic wave at the transducers 20c and 20d for reception is delayed more as farther from the transducers 20a and 20b for transmission. Therefore, the received signal in the transducers 20c and 20d for reception continues from the first arrival to the last arrival of the surface acoustic wave with a little attenuation so as to form a trapezoid signal (see FIG. 7). If a finger, a pen or the like touches one point in the touch area TE, the surface acoustic wave is attenuated at the touched portion. The touch position is detected in accordance with the position where the level of the received signal is attenuated.

Note that FIG. 7 shows only timings of the excitation signal and the received signal, and real waveforms of the signals are not shown. Namely, the real excitation signal is a burst wave in which a rectangular wave of a frequency at approximately 20 MHz continues for approximately 10-20 pulses. The surface acoustic wave consisting of this burst wave propagates as a Rayleigh wave. Therefore, the received signal has a waveform that is obtained by receiving the surface acoustic wave consisting of this burst wave with some delay depending on the position. Note that this burst wave is generated at an approximate period so as to be applied to two transducers 20a and 20b for excitation alternately.

The transducers 20a-20d have the same structure. Therefore, the structure of the transducer will be described only about one transducer 20a. In this description and in the attached drawings, a whole set of the transducers 20a-20d or a part thereof may be referred to as a "transducer 20".

Note that the transducer 20 and the wiring electrodes are drawn in a larger scale than the touch area TE in FIG. 1. Real dimensions are as follows, for example. A length of one side of the glass substrate 11 is a few centimeters to a few tens centimeters, a thickness of the same is a few tenth millimeters to a few millimeters, and a width of each transducer 20 is approximately a few millimeters. Namely, most of the surface of the glass substrate 11 is occupied by the touch area TE except for the peripheral small area. In addition, a scale in the vertical direction is larger than a scale in the horizontal direction in FIG. 3.

As shown well in FIGS. 2 and 3, the transducer 20a has a structure (the SPT structure) in which a piezoelectric thin film 21 is sandwiched between a plate electrode 22 and a comb-like electrode 23. The comb-like electrode 23 includes a plurality of comb-like electrode fingers 24, 24, 24, ... each of which has a dog-legged shape in the plan view, a linear shaped bus electrode 25 that is connected to one end of each of the plural comb-like electrode fingers 24. Note that the plate electrode 22 is opposed to the comb-like electrode finger 24 of the comb-like electrode 23 via the piezoelectric thin film 21.

The piezoelectric thin film 21 is made of zinc oxide (ZnO) and has a thickness of approximately 2 microns for example and a width of approximately a little more than 2 mm for example. The plate electrode 22 is made of aluminum, for example and has a thickness of approximately 0.4 microns for example and a width of approximately 2 mm for example. The comb-like electrode 23 is formed by printing nano silver paste (silver paste consisting of fine particles) and baking it, for example. The comb-like electrode finger 24 has a thickness of approximately 1.0-1.5 microns for example, a width of approximately 60 microns for example and a space of approximately 90 microns for example that means a pitch of approximately 150 microns for example. The bus electrode 25 has a thickness of approximately 2.5 microns for example and a width of approximately 150 microns for example.

Note that the dimensions of the piezoelectric thin film 21, the plate electrode 22 and the comb-like electrode 23 may be other values than the above-described values. For example, the width of the piezoelectric thin film 21 may be selected from the range of approximately 1-3 mm. The thickness of the plate electrode 22 may be selected from the range of approximately 0.3-0.4 microns, for example. The width of the plate electrode 22 may be selected from the range of approximately 1-2 mm, for example. The thickness of the comb-like electrode finger 24 may be selected from the range of approximately 1-2 microns, for example. The width of the comb-like electrode finger 24 may be selected from the range of approximately 50-75 microns, for example. The space of the comb-like electrode finger 24 may be selected from the range of approximately 75-100 microns, for example. The thickness of the bus electrode 25 may be selected from the range of approximately 2-3 microns, for example. The width of the bus electrode 25 may be selected from the range of approximately 100-250 microns, for example.

The comb-like electrode 23 and the plate electrode 22 of each of the transducers 20a-20d are connected to the wiring electrodes 30a-30d and 31a-31d at the connection portion SB, respectively. Each of the wiring electrodes 30a-30d and 31a-31d is led along the outer rim of the transducer 20 on the glass substrate 11 and is drawn out at one portion of the glass substrate 11 located at the lower right portion in FIG. 1 as a wire connection portion KS. The wire connection portion KS is connected to a flexible cable or the like (not shown) so as to be connected to a signal process circuit. Note that a whole or a part of the wiring electrodes 30a-30d or 31a-31d may be referred to as a "wiring electrode 30" or a "wiring electrode 31", respectively.

In FIG. 3, the wiring electrodes 30 and 31 respectively include electrode base portions 301 and 311 formed on the glass substrate 11 by printing the nano silver paste and electrode main bodies 302 and 312 formed by printing hybrid nano silver paste (silver paste consisting of a mixture of large particles and fine particles) on the electrode base portion 311. The bus electrode 25 and the plate electrode 22 are connected to the electrode base portions 301 and 311 from each of the connection portions SB.

Each of the electrode base portions 301 and 311 has a thickness of approximately 2-3 microns for example and a width of approximately 200 microns for example. Each of the electrode main bodies 302 and 312 has a thickness of approximately 20 microns and a width of approximately 200 microns. A space between the wiring electrode 30 and the wiring electrode 31 is approximately 200 microns, and a space between the wiring electrode 31 and the bus electrode 25 (the piezoelectric thin film 21) is approximately 150 microns.

Note that the dimensions of the electrode base portions 301 and 311 and the spaces between them may be other values than the above-described values. For example, the widths of the electrode base portions 301 and 311 as well as the widths of the electrode main bodies 302 and 312 may be selected from a range of approximately 100-250 microns. The space between the wiring electrode 30 and the wiring electrode 31 may be selected from a range of approximately a few tens microns to 250 microns. The space between the wiring electrode 31 and the bus electrode 25 (the piezoelectric thin film 21) may be selected from a range of approximately a few tens microns to 150 microns.

Silver particles of very small grain sizes at approximately a few nanometers are used for the nano silver paste. Silver particles of very small grain sizes at approximately a few nanometers and silver particles of relatively large grain sizes at approximately 1-2 microns are mixed in the hybrid nano silver paste. When using the nano silver paste, a resistivity thereof can be reduced to approximately one tenth of the conventional silver paste (in which silver particles of large grain sizes at approximately 1-2 microns are used), and a thin film having a thickness of approximately 1 microns can be formed. When using the hybrid nano silver paste, a resistivity thereof can be also reduced to approximately one tenth of the conventional silver paste. Both the nano silver paste and the hybrid nano silver paste can be applied by multiple printing so that a thick film can be formed. In this case, the hybrid nano silver paste can form a thick film readily by printing smaller number of times. For example, a thickness of approximately 20 microns described above can be formed by printing the hybrid nano silver paste once. Note that both the nano silver paste and the hybrid nano silver paste are available on the market and are known well.

The thick film of the electrode main body 302 or 312 reduces a total resistance of the wiring electrode 30 or 31. The electrode base portion 301 or 311 prevents a migration on the glass substrate 11 in the printing process and enables a good electrical and mechanical connection with the electrode main bodies 302 and 312. Consequently, the wiring electrodes 30 and 31 having sufficiently small resistances can be formed by small cross-sectional areas.

In this embodiment, the connection portion SB of the wiring electrodes 30 and 31 with the comb-like electrode 23 and the plate electrode 22 are provided at the position described below. Namely, as shown well in FIG. 4, when dividing the transducer 20 into two areas EA and EB in the length direction M1 of the bus electrode 25, the connection portion SB of the bus electrode 25 with the wiring electrode 30 is provided in one area EA, and the connection portion SB of the plate electrode 22 with the wiring electrode 31 is provided in the other area EB.

Furthermore, in this embodiment, these two connection portions SB are located at the positions that divide the length of the transducer 20, i.e., the length of the area EA plus the length of the area EB into three uniformly.

The transducer 20 for excitation is supplied with a power of an excitation voltage from these two connection portions SB. Namely, connection portion SB is a power supplying point. A voltage distribution when the power is supplied to the transducer 20 is as follows.

In FIG. 5, the horizontal axis represents the length in the excitation area of the transducer 20 that is approximately 120 mm at most, the vertical axis represents a voltage intensity when the power is supplied from the two connection portions SB (the power supplying points 1 and 2), and the curved line JR1 represents the voltage distribution. According to this graph, the voltage intensity is minimum at the power supplying points 1 and 2, and it increases along with distance from the power supplying points 1 and 2. However, there is no large variation as a whole, and the voltage distribution is substantially uniform over the entire excitation area.

Note that a curved line JRj in FIG. 5 shows an example of the voltage distribution in the case where the power is supplied from one end portion (an excitation end 1) as the conventional structure. It is understood from comparison between the curved line JR1 and the curved line JRj that the curved line JR1 has a smaller variation of the voltage intensity (variation of amplitude) and a more uniform voltage distribution than the curved line JRj.

In general, when applying an excitation voltage to the transducer 20, the excitation voltage decreases gradually along with distance from the power supplying point. However, as a reflected wave is generated at the end, it is equivalent of the state where a signal of the reflected wave is applied to the end. The signal of the reflected wave also decreases gradually along with distance from the end. A combination of them is the curved line JRj shown in FIG. 5.

As shown in FIG. 6, an equivalent circuit of the transducer 20 can be shown as a distributed constant circuit. The voltage distribution shown in FIG. 5 is based on a simulation using the equivalent circuit. The equivalent circuit includes a matching circuit portion that is not shown in FIG. 1 and leading portions of the wiring electrodes 30 and 31. The portion of the transducer 20 is made of a combination of plural units. Each of the units is obtained by dividing the excitation area into 2,000 portions uniformly, for example Each of the units includes a resistance R1 of the plate electrode 22 and the bus electrode 25, an inductance L1 of the comb-like electrode 23 and the plate electrode 22, a capacitance C2 between the comb-like electrode 23 and the plate electrode 22, and a resistance R2 of the comb-like electrode finger 24. These values are, for example, $R1=7.5$ mO, $L1=71.4$ pH, $C2=0.96$ pF, and $R2=72$ kO.

As described above, according to the touch panel device 1 of the first embodiment, the power supplying point to the transducer 20 is not located at the end of the excitation area but in the excitation area. Furthermore, the positions of the connection portions SB are different between the plate electrode 22 and the bus electrode 25 so that the distances from the end are different. Thus, the effect of the reflection at the end can be reduced. As a result, the excitation voltage does not varies largely in the excitation area, so that the voltage distribution can be substantially uniform over the entire excitation area. Consequently, the influence of the reflected wave at the end can be suppressed so that a variation of the excitation intensity of the surface acoustic wave can be reduced without using a termination resistor.

In addition, also for the transducer 20 for reception, the influence of the reflected wave at the end can be suppressed so that a variation of the received signal can be reduced in the reception area without using a termination resistor.

When a variation of the excitation intensity of the surface acoustic wave is reduced and a variation of the received signal in the reception area is suppressed, a detection accuracy is increased for detecting a touch position in accordance with a position where a level of the received signal is attenuated. Namely, the reduction of the variation of the received signal in the reception area facilitates detection of a level change generated between them. In addition, when converting the received signal into a digital value, the conversion accuracy is improved with a A/D converter having the same number of bits. As a result, touching the touch area TE with a finger or a pen can be detected with a high precision.

Second Embodiment

In the first embodiment described above, the power supplying point is one for each of the plate electrode 22 and the comb-like electrode 23 of the transducer 20. Next, the case where the power is supplied to the plate electrode 22 and the comb-like electrode 23 from two point each will be described.

Figure 8:
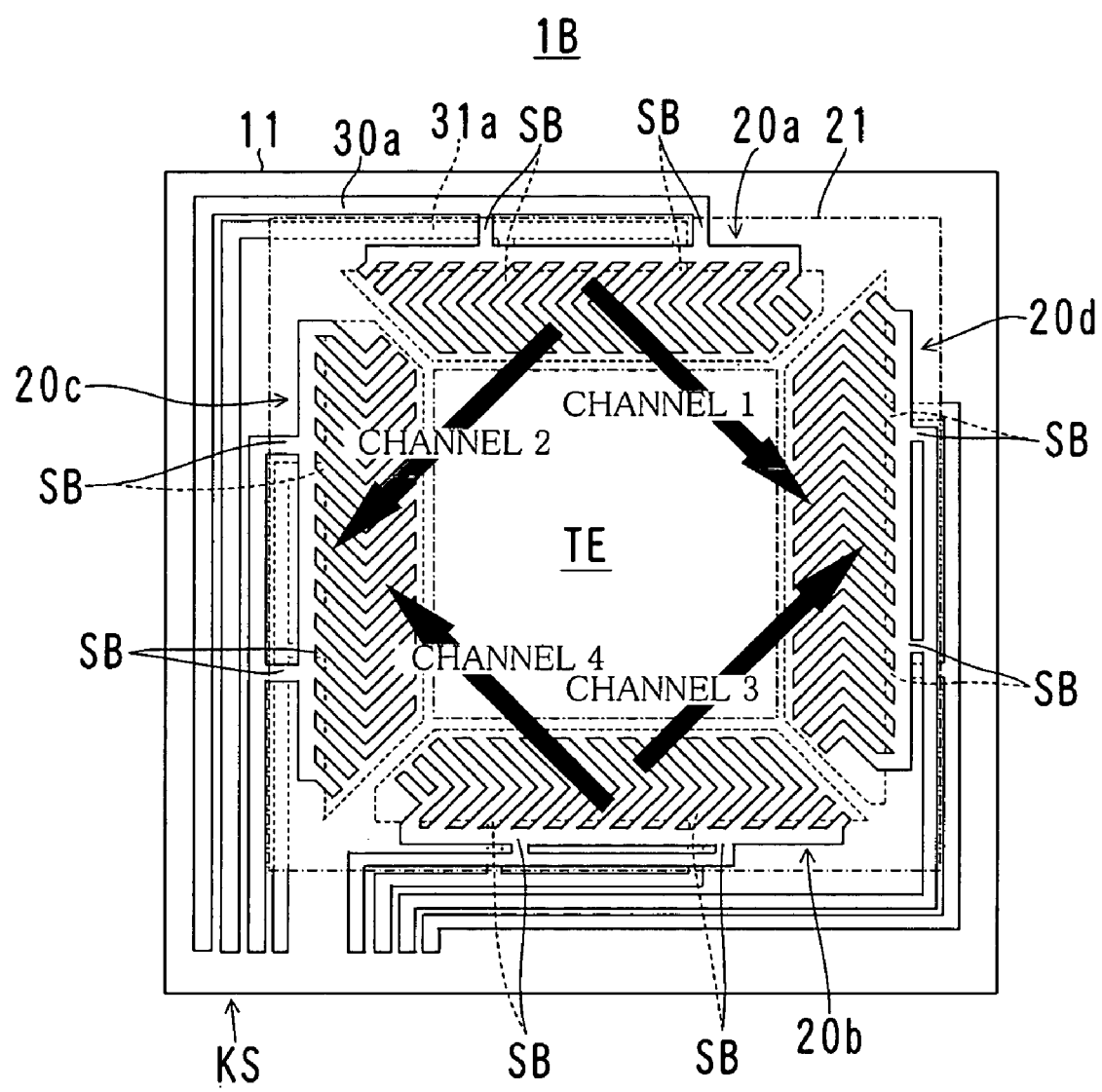
FIG. 8 is a plan view of a touch panel device according to a second embodiment of the present invention.
Figure 9:
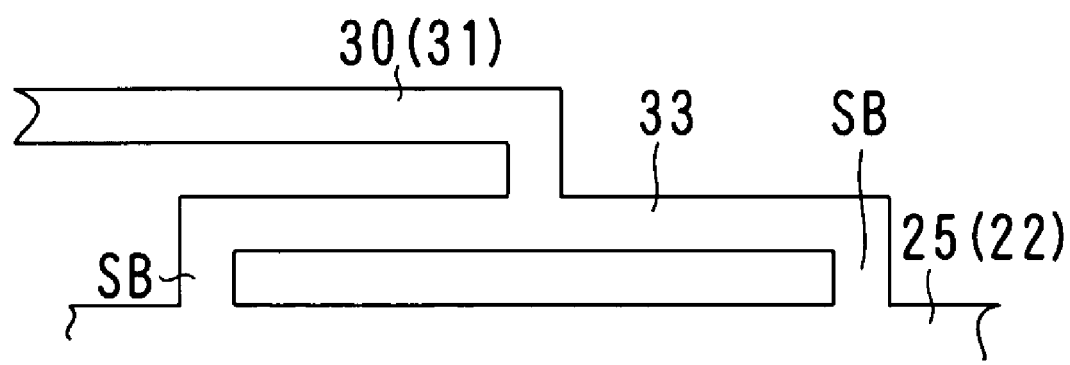
FIG. 9 shows a variation of a connection between a connection portion and a wiring electrode.

FIG. 8 is a plan view of a touch panel device 1B according to a second embodiment of the present invention, and FIG. 9 shows a variation of a connection between the connection portion SB and the wiring electrodes 30 and 31. In FIG. 8, a basic structure is the same as the touch panel device 1 of the first embodiment shown in FIG. 1, so only the difference between them will be described.

In the touch panel device 1B shown in FIG. 8, two connection portions SB of the comb-like electrode 23 and the plate electrode 22 with the wiring electrodes 30 and 31 are provided for each of the transducers 20. The connection portion SB is provided at the position described below. Namely, among two areas EA and EB shown in FIG. 4, one connection portion SB of the bus electrode 25 with the wiring electrode 30 as well as the connection portion SB of the plate electrode 22 with the wiring electrode 31 is provided in one area EA, while the other connection portion SB of the plate electrode 22 with the wiring electrode 31 as well as the other connection portion SB of the bus electrode 25 with the wiring electrode 30 is provided in the other area EB. Furthermore, these connection portions SB are provided at positions that divide the length of the transducer 20 into three substantially uniformly.

According to the power supply method of the second embodiment, the voltage distribution in the transducer 20 is further improved so that the variation becomes smaller, and the voltage distribution becomes more uniform over the entire excitation area.

In the second embodiment, the connection portions SB for the plate electrode 22 and the comb-like electrode 23 are disposed closely to each other. However, it is possible to dispose them so that they are shifted from each other. For example, total four connection portions SB may be disposed at positions such that the excitation area is divided into five portions uniformly. It is possible to dispose the connection portions SB for the plate electrode 22 and the comb-like electrode 23 at three or more positions.

In addition, it is possible to connect the two connection portions SB to each other via a connection electrode 33 and to connect the middle portion of the connection electrode 33 to the wiring electrode 30 or 31 as shown in FIG. 9, so that an electrical valance can be obtained between the two connection portions SB for each of the two connection portion SB of the bus electrode 25 and the wiring electrode 30 as well as the two connection portion SB of the plate electrode 22 with the wiring electrode 31.

Third Embodiment

In the first embodiment described above, a material to be used or a cross-sectional area is different between the plate electrode 22 and the bus electrode 25 of the transducer 20, so a resistance per unit length is different between them. In the third embodiment, a material to be used, a cross-sectional area or the like is adjusted so that a resistance per unit length becomes equal.

Figure 10:
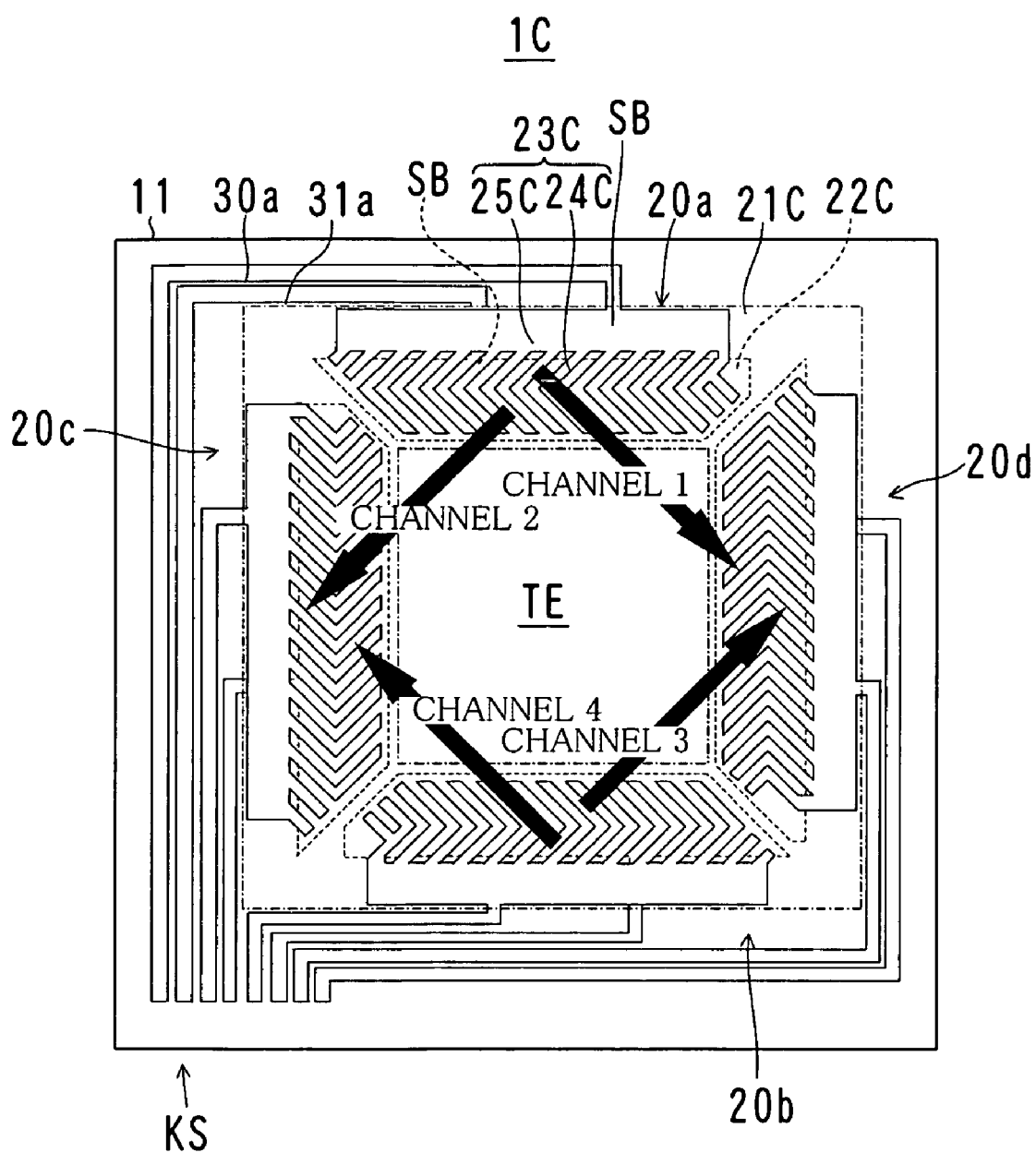
FIG. 10 is a plan view of a touch panel device according to a third embodiment of the present invention.

FIG. 10 is a plan view of a touch panel device 1C according to a third embodiment of the present invention. In FIG. 10, a basic structure is the same as the touch panel device 1 of the first embodiment shown in FIG. 1, so only a difference between them will be described.

In FIG. 10, the plate electrode 22C and a bus electrode 25C of the transducer 20 are made of the same aluminum. Namely, a resistivity of the material is the same. The plate electrode 22C has a thickness of 0.4 microns approximately, and a width of 1 mm approximately. The bus electrode 25C has a thickness of 0.8 microns approximately, and a width of 0.5 mm approximately. Namely, the plate electrode 22C and the bus electrode 25C have the same cross-sectional area. Therefore, the plate electrode 22C and the bus electrode 25C have the same resistance per unit length.

In this way, a resistance per unit length can be set equally by selecting an appropriate material and cross-sectional area. Thus, a variation of the voltage distribution in the excitation area of the transducer can be further reduced, so that the voltage distribution becomes more uniform in the entire excitation area.

Note that if materials to be used for the plate electrode 22C and the bus electrode 25C are different, an appropriate thickness and electrode width may be selected in accordance with a resistivity of each material. The contents of the third embodiment can be applied to either the first or the second embodiment.

In each of the embodiments described above, the plate electrodes 22 and 22C are disposed under the piezoelectric thin films 21 and 21C, and the comb-like electrodes 23 and 23C are disposed on the piezoelectric thin films 21 and 21C, respectively. However, the opposite position relationship of them can be adopted. Though no special consideration is taken into account for electric lengths from the connection portion SB to the wire connection portion KS in the transducers 20a-20d, it is better to set them to be equal to each other by arranging the wiring electrodes 30a-30d and 31a-31d as well as the wire connection portion KS appropriately.

In addition, though a so-called SPT structure of the transducer 20 is exemplified in which the piezoelectric thin film 21 is sandwiched between the plate electrode 22 and the comb-like electrode 23 in each of the embodiments described above, the present invention can be applied to other structures such as an opposed electrode structure of the transducer. The opposed electrode structure is shown in FIG. 23 of Japanese unexamined patent publication 2004-171213 mentioned above. In this case, the opposed electrode structure can be formed either between the glass substrate 11 and the piezoelectric thin film 21 or on the piezoelectric thin film 21. The piezoelectric thin film 21 can be made of an aluminum nitride or the like instead of a zinc oxide. In stead of the piezoelectric thin film 21, a thin film ceramic element may be used.

In each of the embodiments described above, a structure, a shape, dimensions, numbers, a material, a forming method or the like of a whole or a part of the transducer 20 and the touch panel devices 1, 1B and 1C can be modified if necessary in accordance with the spirit of he present invention.

The present invention can be used for an input device of a personal computer, a mobile computer, a personal digital assistant device or the like.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A touch panel device comprising:
  a touch area arranged at the middle portion of a transparent substrate; and
  at least one transducer for excitation arranged at a peripheral portion of the touch area, the transducer for excitation including a film-like piezoelectric element and two electrodes for excitation,
  at least one transducer for reception arranged at a peripheral portion of the touch area, the transducer for reception including a film-like piezoelectric element and two electrodes for reception,
  at least one of the two electrodes for excitation being a comb-like electrode including plural comb-like electrode fingers and a linear bus electrode to which one end of each of the plural comb-like electrode fingers is connected,
  at least one connection portion for one of the two electrodes for excitation being disposed in one of two areas delimited in a middle of a length direction of the linear bus electrode, and
  at least one connection portion for the other electrode of the two electrodes for excitation being disposed in the other area of the two areas.

2. The touch panel device according to claim 1, wherein two connection portions are provided for each of the two electrodes for excitation,
  one of the two connection portions is disposed in one of the two areas, and
  the other portion of the two connection portions is disposed in the other area of the two areas.

3. The touch panel device according to claim 1, wherein the transducer for excitation includes a plate electrode that is formed on one surface of the piezoelectric element so as to be opposed to the comb-like electrode, the comb-like electrode being formed on the other surface of the piezoelectric element,
  a wiring electrode is provided at the outer side of each of the comb-like electrode and the plate electrode in parallel with the comb-like electrode or the plate electrode, and
  the wiring electrode is connected to the linear bus electrode or the plate electrode at the at least one connection portion disposed in one of the two areas or the at least one connection portion disposed in the other area of the two areas.

4. The touch panel device according to claim 2, wherein the transducer for excitation includes a plate electrode that is formed on one surface of the piezoelectric element so as to be opposed to the comb-like electrode, the comb-like electrode being formed on the other surface of the piezoelectric element,
  a wiring electrode is provided at the outer side of each of the comb-like electrode and the plate electrode in parallel with the comb-like electrode or the plate electrode, and
  the wiring electrode is connected to the two connection portions.

5. The touch panel device according to claim 1, wherein the transducer for excitation includes a plate electrode that is formed on one surface of the piezoelectric element so as to be opposed to the comb-like electrode, the comb-like electrode being formed on the other surface of the piezoelectric element, and
  a resistance of the linear bus electrode per unit length is equal to a resistance of the plate electrode per unit length.

6. The touch panel device according to claim 2, wherein the transducer for excitation includes a plate electrode that is formed on one surface of the piezoelectric element so as to be opposed to the comb-like electrode, the comb-like electrode being formed on the other surface of the piezoelectric element, and
  a resistance of the linear bus electrode per unit length is equal to a resistance of the plate electrode per unit length.

7. The touch panel device according to claim 1, wherein the at least one connection portion disposed in one of the two areas and the at least one connection portion disposed in the other area of the two areas are arranged at positions that divide a length of the transducer into three substantially equally.

8. The touch panel device according to claim 2, wherein the one of the two connection portions disposed in one of the two areas and the other portion of the two connection portions disposed in the other area of the two areas are arranged at positions that divide a length of the transducer into three substantially equally.

* * * * *